(12) United States Patent
Chang

(10) Patent No.: US 10,387,329 B2
(45) Date of Patent: Aug. 20, 2019

(54) PROFILING CACHE REPLACEMENT

(71) Applicant: Google Inc., Mountain View, CA (US)

(72) Inventor: Chih-Chung Chang, Taipei (TW)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/097,177

(22) Filed: Apr. 12, 2016

(65) Prior Publication Data

US 2017/0228322 A1    Aug. 10, 2017

Related U.S. Application Data

(60) Provisional application No. 62/293,688, filed on Feb. 10, 2016.

(51) Int. Cl.
*G06F 12/122* (2016.01)
*G06F 12/123* (2016.01)
(Continued)

(52) U.S. Cl.
CPC .......... *G06F 12/122* (2013.01); *G06F 3/061* (2013.01); *G06F 3/064* (2013.01); *G06F 3/0605* (2013.01);
(Continued)

(58) Field of Classification Search
CPC ...... G06F 12/122; G06F 3/0605; G06F 3/064; G06F 3/0647
See application file for complete search history.

(56) References Cited

U.S. PATENT DOCUMENTS

| 6,457,102 B1* | 9/2002 | Lambright | G06F 12/0866 |
|---|---|---|---|
| | | | 711/129 |
| 2003/0093621 A1* | 5/2003 | DeSota | G06F 12/0848 |
| | | | 711/118 |

(Continued)

FOREIGN PATENT DOCUMENTS

| DE | 102016225545 | 8/2017 |
|---|---|---|
| EP | 0362880 | 4/1990 |

(Continued)

OTHER PUBLICATIONS

"International Search Report and Written Opinion", Application No. PCT/US2016/068625, dated Apr. 12, 2017, 14 pages.

(Continued)

*Primary Examiner* — Tuan V Thai
*Assistant Examiner* — Alexander J Yoon
(74) *Attorney, Agent, or Firm* — Colby Nipper PLLC

(57) ABSTRACT

Profiling cache replacement is a technique for managing data migration between a main memory and a cache memory to improve overall system performance. A profiler maintains counters that count memory requests for access to the pages maintained in both the cache memory and the main memory. Based on this access-request count information, a mover moves pages between the main and cache memories. For example, the mover can swap little-requested pages of the cache memory with highly-requested pages of the main memory. The mover can do so, for instance, when the counters indicate that the number of page access requests for highly-requested pages of the main memory is greater than the number of page access requests for little-requested pages of the cache memory. To avoid impeding the operations of memory users, the mover can perform page swapping in the background at predetermined time intervals, such as once every microsecond (μs).

20 Claims, 8 Drawing Sheets

(51) Int. Cl.
| | |
|---|---|
| *G06F 12/02* | (2006.01) |
| *G06F 12/08* | (2016.01) |
| *G06F 12/0868* | (2016.01) |
| *G06F 12/0897* | (2016.01) |
| *G06F 12/121* | (2016.01) |
| *G06F 3/06* | (2006.01) |
| *G06F 12/0804* | (2016.01) |
| *G06F 12/12* | (2016.01) |

(52) U.S. Cl.
CPC ......... *G06F 3/0647* (2013.01); *G06F 3/0665* (2013.01); *G06F 3/0673* (2013.01); *G06F 12/0284* (2013.01); *G06F 12/08* (2013.01); *G06F 12/0804* (2013.01); *G06F 12/0868* (2013.01); *G06F 12/0897* (2013.01); *G06F 12/121* (2013.01); *G06F 12/123* (2013.01); *G06F 12/12* (2013.01); *G06F 2212/1016* (2013.01); *G06F 2212/1021* (2013.01); *G06F 2212/152* (2013.01); *G06F 2212/251* (2013.01); *G06F 2212/253* (2013.01); *G06F 2212/601* (2013.01)

(56) References Cited

U.S. PATENT DOCUMENTS

| | | | | |
|---|---|---|---|---|
| 2011/0202735 | A1* | 8/2011 | Kono | G06F 11/1451 711/162 |
| 2011/0320754 | A1* | 12/2011 | Ichikawa | G06F 3/0605 711/165 |
| 2012/0017039 | A1* | 1/2012 | Margetts | G06F 12/08 711/105 |
| 2013/0091331 | A1* | 4/2013 | Moraru | G06F 12/126 711/143 |
| 2013/0191605 | A1* | 7/2013 | Solihin | G06F 12/0284 711/156 |
| 2014/0108759 | A1* | 4/2014 | Iwamitsu | G06F 3/0604 711/165 |
| 2014/0281110 | A1 | 9/2014 | Duluk et al. | |
| 2015/0067258 | A1 | 3/2015 | Jung et al. | |
| 2015/0278091 | A1* | 10/2015 | Wilkerson | G11C 7/1072 711/105 |
| 2016/0004567 | A1* | 1/2016 | Michel | G06F 9/505 718/104 |
| 2016/0062893 | A1* | 3/2016 | Tune | G06F 12/0833 711/135 |

FOREIGN PATENT DOCUMENTS

| | | |
|---|---|---|
| EP | 0472868 | 3/1992 |
| EP | 1505506 | 2/2005 |
| GB | 2547306 | 8/2017 |
| JP | 2001517829 | 10/2001 |
| JP | 2008090554 | 4/2008 |
| JP | 2012178121 | 9/2012 |
| KR | 20050046535 | 5/2005 |
| WO | 2012111113 | 8/2012 |
| WO | 20170139037 | 8/2017 |

OTHER PUBLICATIONS

"Combined Search and Examination Report", GB Application No. 1620880.3, dated May 19, 2017, 6 pages.

"Written Opinion", PCT Application PCT/US2016/068625, dated Aug. 16, 2017, 6 pages.

"Foreign Office Action", Taiwanese Application No. 105141709, dated Mar. 27, 2018, 12 pages.

"Foreign Office Action", European Application No. 16826601.3, dated Sep. 18, 2018, 3 pages.

"Foreign Office Action", Taiwanese Application No. 105141709, dated Sep. 26, 2018, 7 pages.

"International Preliminary Report on Patentability", PCT Application No. PCT/US2016/068625, dated Aug. 14, 2018, 7 pages.

"Foreign Office Action", British Application No. 1620880.3, dated May 20, 2019, 3 pages.

* cited by examiner

PROFILING CACHE REPLACEMENT

RELATED APPLICATION

This application claims priority under 35 U.S.C. § 119 to Provisional Application No. 62/293,688, titled "Profiling Cache Replacement" and filed on Feb. 10, 2016, the entire disclosure of which is incorporated by reference herein.

BACKGROUND

In computing, a cache is a block of memory used for temporary storage of frequently accessed data, and allows future requests for cached data to be more quickly serviced than requests for non-cached data. If requested data is contained in the cache (a scenario known as a "cache hit"), the request can be served by simply reading the cache, which is comparably faster than accessing the data from main memory. Conversely, if the requested data is not contained in the cache (a scenario known as a "cache miss"), the data is recomputed or, in conventional techniques, filled into the cache from its original storage location, which is slower than simply reading the data from the cache. Overall system performance is thus improved, in terms of speed, when a larger portion of data requests are serviced from cache memory.

Since cache memory is typically smaller than main memory, data previously filled into the cache may need to be replaced by data used more recently. To do so, cache replacement algorithms are employed. Conventional cache replacement algorithms include least recently used (LRU) algorithms, most recently used (MRU) algorithms, least frequently used (LFU) algorithms, random replacement algorithms, and so on. Broadly speaking, cache replacement algorithms are a set of optimizing instructions that a computer program or a hardware-maintained structure implements for managing the cache memory. In particular, cache replacement algorithms select which information in the cache memory to evict in order to make room for information from main memory.

Many of the conventional cache replacement algorithms do not maintain information about data blocks that are not currently in cache memory. As a result, when a size of a working set of data exceeds a size of the cache memory, excessive fill and eviction traffic can be generated. This excessive fill and eviction traffic can cause a condition known as "thrashing", in which a number of cache misses increases dramatically and time spent performing cache fill and eviction as a result of the misses can surpass the time spent performing the originally requested computing operations for the working set of data. Accordingly, conventional cache replacement algorithms have drawbacks which are capable of hampering computing operations.

SUMMARY

This document describes profiling cache replacement. Profiling cache replacement is a technique for managing data migration between a main memory and a cache memory to improve overall system performance. Both the cache and main memories are configured to store pages of data—the cache memory being smaller than the main memory and thus capable of maintaining fewer pages than the main memory. Compared to the main memory, however, the cache memory has at least one of lower latency, higher bandwidth, or lower power usage. Consequently, system performance improves when a larger portion of data access requests can be serviced from the cache memory. To increase the portion of data access requests serviced from the cache memory, profiling cache replacement caches highly-requested pages in the cache memory and migrates (or leaves) less-requested pages in the main memory.

Unlike conventional cache replacement techniques, profiling cache replacement employs a profiler to maintain counters that count memory requests for access to not only the pages maintained in the cache memory, but also the pages maintained in the main memory. Based on the information collected by the profiler (e.g., about memory access requests), a mover moves pages between the main and cache memories. By way of example, the mover can swap highly-requested pages of the main memory, such as a most-requested page of the main memory, with little-requested pages of the cache memory, such as a least-requested page of the cache memory. The mover can do so, for instance, when the counters indicate that the number of page access requests for highly-requested pages of the main memory is greater than the number of page access requests for little-requested pages of the cache memory.

So as not to impede the operations of memory users (e.g., client applications), the requests made by the memory users are not blocked for cache misses, and the mover performs the page swapping in the background. With regard to the non-blocking behavior, when a page access request results in a cache miss, the requested page is not immediately loaded into the cache memory so that the request can be serviced from the cache memory. Instead, the request is serviced directly from the main memory. With regard to performing page swapping in the background, priority is given to servicing requests made by memory users over the page swapping performed by the mover. To do so, the mover is limited to swapping pages at predetermined time intervals, such as once every microsecond (µs). At the predetermined time interval, the mover determines whether the number of page access requests for a highly-requested page of the main memory exceeds the number of page access requests for a little-requested page of the cache memory. If so, the mover swaps the main memory's highly-requested page with the cache memory's little-requested page. In so doing, profiling cache replacement optimizes the pages with which the cache memory is filled, and does so without interfering with operations of memory users, the result being improved system performance.

This summary is provided to introduce simplified concepts concerning the techniques, which are further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices for profiling cache replacement are described with reference to the following drawings. The same numbers are used throughout the drawings to reference like features and components.

DETAILED DESCRIPTION

Overview

Figure 1:
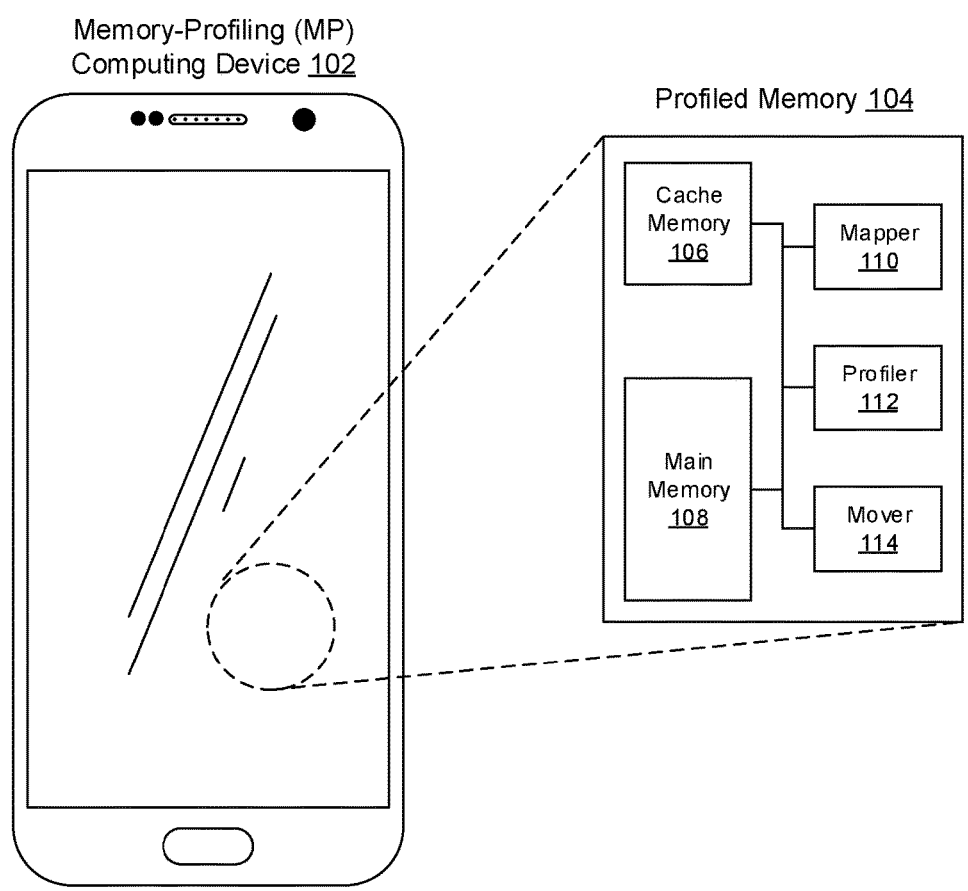
FIG. 1 illustrates an example environment in which the techniques can be implemented.

This document describes techniques using, and devices enabling, profiling cache replacement. Through use of these techniques and devices, data migration between a main memory and a cache memory is managed in a manner that improves system performance over conventional cache replacement techniques, such as least recently used (LRU) algorithms, most recently used (MRU) algorithms, least frequently used (LFU) algorithms, random replacement algorithms, and so on. The improved performance results, at least partially, from reducing an amount of "thrashing" that occurs, relative to conventional techniques, in conjunction with migrating data between the main and cache memories. The term "thrashing" refers to a condition caused by excessive fill and eviction traffic that can be generated when a size of a working set of data exceeds a size of the cache memory. Thrashing can result in a dramatic increase in a number of cache misses, which cause the system to spend more time performing cache fill and eviction for the resulting misses than performing originally requested computing operations for the working set of data. Through application of profiling cache replacement, data in cache and main memories can be managed in a manner that reduces thrashing and improves overall system performance.

By way of example, a memory user, such as a client application, can request access to a particular page loaded in memory. In this example, assume that the client application requests access to the particular page from memory as part of an initialization process. During the initialization process, the client application may request access to the particular page many times. In order to most efficiently service the client application's requests, the particular page can be loaded into cache memory, e.g., so that requests for the particular page can be serviced more quickly than if serviced from main memory. After completion of the initialization process, the client application may not need to access the particular page, or may access it little relative to other pages. During normal operation, the client application may instead request access to other pages more, such that the requests to access the other pages eventually exceed the requests for the particular page—since the initialization process has completed and the particular page is no longer requested.

Efficiency of the client application's normal operation may thus be improved by servicing the requests for the other pages from cache memory, e.g., since the cache memory, although smaller in size than the main memory, has a lower latency, higher bandwidth, or lower power usage than the main memory. In other words, efficiency may be improved by swapping one of the other pages with the particular page. As used herein "swapping" refers to an action or series of actions that enables data corresponding to the one other page to be filled into the cache memory and evicting the data corresponding to the particular page from the cache memory. In some scenarios, the data corresponding to the one other page is simply exchanged with the data corresponding to the particular page, such that the data of the one other page takes the place of the particular page's data in the cache memory and the particular page's data takes the place of the data of the one other page in the main memory. In such scenarios, when a page is cached, its data resides solely in the cache memory, and not in the main memory.

In other scenarios, however, at least some data for each page in the memory exists in the main memory regardless of whether a page corresponding to the data is cached or not. In these scenarios, when a page is cached, a page in the cache memory and a page in the main memory together provide the valid data of the page. In some instances, however, some of the pages in the cache memory may not contain valid data, because those pages are not filled. Some of the pages in the main memory also may not contain valid data, such as when an entirety of those pages' data has been modified in the cache memory. Under these scenarios, swapping the particular page's data with the data corresponding to the one other page is not simply an exchange of data as in the first described scenario. Rather, swapping involves evicting the data corresponding to the particular page from the cache memory to a respective page in the main memory. At the respective page, the portions of the data that were modified while in the cache memory are copied to the respective page in the main memory—the copying being limited to the modified blocks, since the respective page still maintains the same data for the unmodified blocks. After the eviction, the page of cache memory from which the data was evicted is filled with the data of the one other page from the main memory. The respective page (e.g., the page into which the evicted data is placed) and the one other page (e.g., the main-memory data that was used to fill the available cache-memory page) do not correspond to the same pages, however.

Regardless of the manner in which the main and cache memories are configured and thus the manner in which their pages are swapped, after the swapping the requests for the one other page can be serviced from the cache memory. To determine when and which pages are swapped between main and cache memories, profiling cache replacement counts accesses to the pages of data maintained in both the main and cache memories. In particular, accesses to the pages in "addressable memory" are tracked with counters. The term "addressable memory" refers to the portions of memory recognized by memory users. In the first scenario described just above, the size of addressable memory corresponds to a size of the main memory plus the size of the cache memory. In the other scenarios, however, the size of addressable memory corresponds to the size of just the main memory. Thus, a number of counters are maintained that corresponds to a number of pages in the main memory. To do so, a profiler can maintain counters for each of the pages in the addressable memory and when access to one of those pages is requested, increment the counter for the page. In the above-discussed other memory configuration and swapping scenarios, a counter is maintained for each page in addressable memory, e.g., a counter is maintained for each page in the main memory since the cached pages are also represented by data in the main memory.

Returning to the discussion of the client application that requests access to the particular page many times during initialization, does not request access or requests access little to the particular page after initialization, and requests access to other pages more during normal operation. The counters maintained by the profiler at some point can indicate that access to at least one of the other pages has been requested more than access to the particular page. Once this is the case, a mover that is configured to move pages from main memory to cache memory, and vice versa, can swap one of the other pages that is more requested than the particular page with the particular page. In particular, the mover can move the more-requested page from main memory into cache memory, and can move the particular page from cache memory into main memory. To keep operation of the client application from being interrupted, requests made by the client application are not blocked, and the act of swapping pages to optimize the data maintained in the cache memory is performed in the background. In particular, when a page access request results in a cache miss, the requested page is not immediately loaded into the cache memory so that the request can be serviced from the cache memory. Instead, the request is serviced directly from the main memory. Further, the mover is limited to initiating page swaps at predetermined time intervals, e.g., once every microsecond (μs). As a result, the mover does not compete with the client application for access to the main or cache memories at other times. Using such techniques, interruption of computing operations may be avoided and thrashing reduced, thereby improving the overall performance of the system.

This is but one simple example of ways in which profiling cache replacement can be performed, other examples and details are provided below. This document now turns to an example environment that references diagrams showing page counter values, after which devices and methods, and an example computing system are described.

Example Environment

FIG. 1 is an illustration of an example environment 100 in which profiling cache replacement can be employed. Environment 100 illustrates a memory-profiling computing device 102 having profiled memory 104. In the particular example of FIG. 1, the memory-profiling computing device 102 is configured as a smartphone, however, other configurations are contemplated. Other configurations of the memory-profiling computing device 102 that are capable of optimizing memory using profiling cache replacement are illustrated in later figures.

Environment 100 also illustrates components of the profiled memory 104. The profiled memory 104 includes cache memory 106 and main memory 108. The cache memory 106 and the main memory 108 are capable of storing data for access by memory users, such as by an operating system, client applications, and so on. For example, the cache memory 106 and the main memory 108 are capable of storing pages of data. As used herein, the term "pages" refers to same-sized blocks of data, e.g., 4-kilobyte (KB) blocks of data. Relative to the main memory 108, the cache memory 106 is smaller—it has less storage and is thus capable of storing fewer pages of data than the main memory 108. Although smaller in terms of storage than the main memory 108, the cache memory has at least one of lower latency, higher bandwidth, or lower power usage than the main memory 108. Due to these characteristics of the cache memory 106, servicing a larger portion of data access requests with cached data rather than with un-cached data results in more efficient request servicing, in terms of speed, power, or some other measure of system efficiency, for the memory-profiling computing device 102.

The profiled memory 104 also includes mapper 110, profiler 112, and mover 114. The mapper 110, the profiler 112, and the mover 114 represent functionality to optimize the performance of the profiled memory 104 by caching highly-used pages and leaving less-used pages in the main memory 108. The mapper 110 is used for each memory access. The mapper 110 maps an input address to an address in the cache memory 106 (e.g., a cache hit) or to an address in the main memory 108 (e.g., a cache miss). In contrast to conventional techniques, when a page access request results in a cache miss, the requested page is not immediately loaded into the cache memory 106 so that the request can be serviced from the cache memory 106. Instead, the request is serviced directly from the main memory 108, e.g., the requested page is provided to a memory user that requested access to the page directly from the main memory 108.

The profiler 112 represents functionality to collect information about memory accesses. By way of example, the profiler 112 tracks numbers of page accesses, such as a number of requests to access the pages in the profiled memory 104. Although the techniques are described herein using the example in which the number of requests to access each page is tracked, the profiler 112 may track memory access in different ways without departing from the spirit or scope of the technique described herein. When sizes of requests are not uniform across each request, for instance, such as when some requests are for 64 B and other requests are for 128 B, the profiler 112 can count bytes instead of the number of requests. Alternately, the profiler 112 can treat larger requests to access pages in memory as multiple requests. In other examples, memory access can be tracked without counting each request to access a page. Rather, read requests for a page can be tracked but write requests not tracked. Likewise, write requests for a page can be tracked while read requests are not tracked.

Regardless of the unit used to track memory access to pages, the profiler 112 can maintain a counter for each page in the cache memory 106 and each page in the main memory 108. When access to a page is requested, the profiler 112 can increment the counter for that page thereby tracking the page accesses. In one or more implementations, however, the profiler 112 maintains fewer counters than one per page of memory. In so doing, the profiler 112 can reduce an amount of memory used to store tracking information that describes page accesses of the profiled memory 104. Details of the manner in which the profiler 112 uses fewer than one counter for each page of memory are discussed herein below.

The mover 114 represents functionality to move pages between the cache memory 106 and the main memory 108. For example, the mover 114 is capable of swapping highly-requested pages of the main memory 108 with little-requested pages of the cache memory 106. As used herein, the term "highly" requested page or pages refers to pages that are requested more than others in the portion of memory under consideration, and may correspond to a most-requested page in the portion under consideration, a top ten percent requested page in the portion, and so on. For example, a highly-requested page in the main memory 108 may be a page for which the number of requests ranks in the top ten percent among the pages in the main memory 108, or it may be the most requested page in the main memory 108. Similarly, the term "little" requested page or pages refers to pages that are requested less than others in the portion of memory under consideration, and may correspond to a least-requested page in the portion under consideration, a bottom ten percent requested page in the portion, and so on. By way of example, a little-requested page in the cache memory 106 may be a page for which the number of requests ranks in the bottom ten percent among the pages in the cache memory 106, or it may be the least requested page in the cache memory. It should be noted, however, that "highly" and "little" are used in conjunction with the portion of memory corresponding to the pages. Thus, a highly-requested page in the main memory 108 can have a fewer number of requests for access than a little-requested page in the cache memory 108, or may have a similar number of requests. However, a highly-requested page in the main memory 108 has a greater number of requests for access than a little requested page in the main memory 108. Additionally, a highly-requested page in the profiled memory 104 (e.g., among the pages in the main memory 108 and the cache memory 106) has a greater number of requests for access than little-requested pages in the profiled memory 104.

In any case, the mover 114 may swap highly-requested pages of the main memory 108 with little-requested pages of the cache memory 106, responsive to a determination that the highly-requested pages of the main memory 108 are requested for access more than the little-requested pages of the cache memory 106. In addition to moving pages between the cache memory 106 and the main memory 108, the mover 114 also represents functionality to make determinations as to whether pages in the main memory 108 are accessed more than the pages in the cache memory 106. The mover 114 may do so by checking the information collected by the profiler 112, e.g., the counters. Once the mover 114 moves pages (e.g., swaps a page in the cache memory 106 with a page in the main memory 108), the mover 114 updates the address information used by the mapper 110, so that future memory access requests are mapped to the correct address in the cache memory 106 or the main memory 108. It should be noted that responsive to a determination that the highly-requested pages of the main memory 108 are not requested for access more than the little-requested pages of the cache memory 106, the mover 114 does not swap pages.

Figure 2:
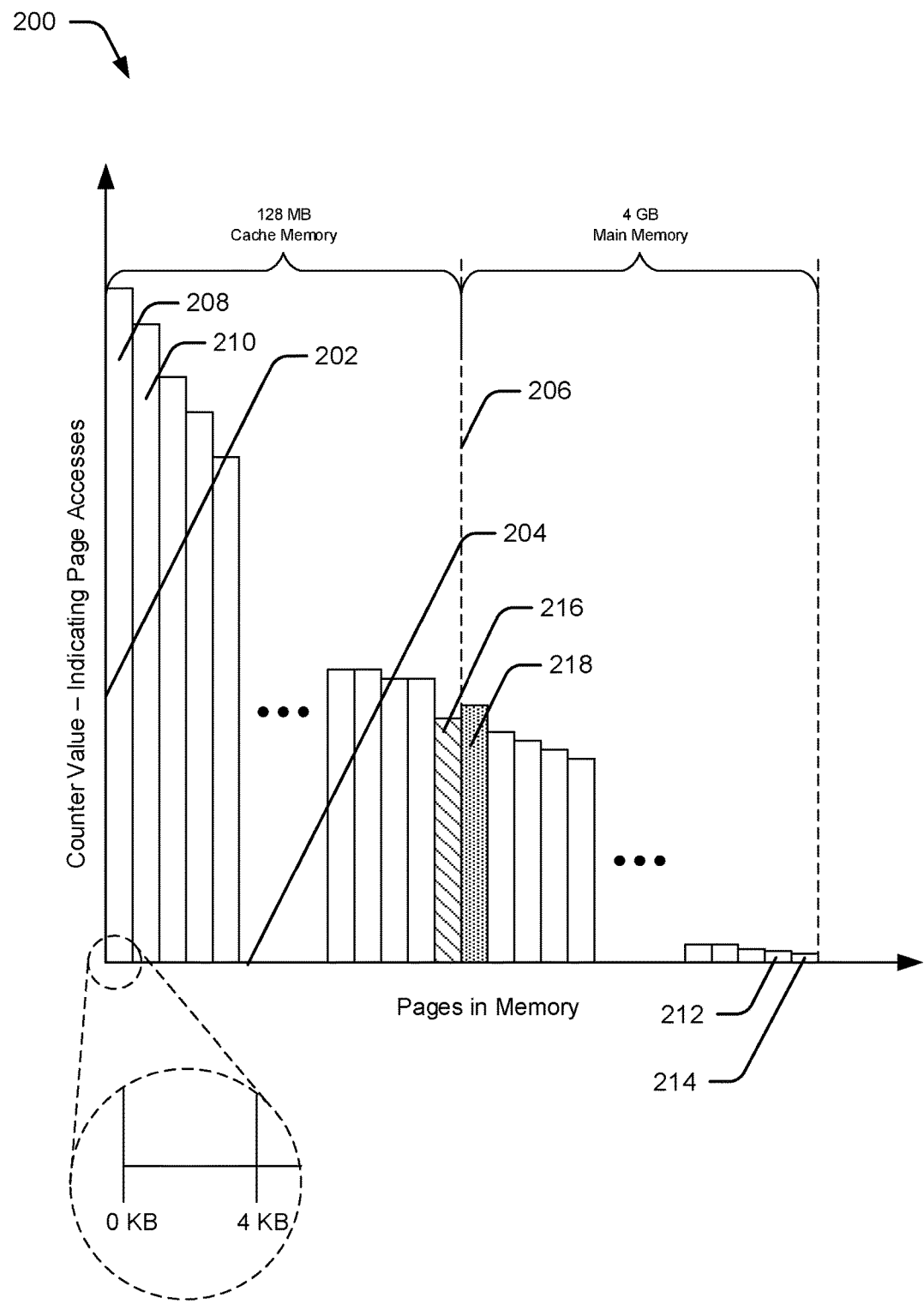
FIG. 2 illustrates a diagram showing example page counter values for main and cache memories at a first time.
Figure 3:
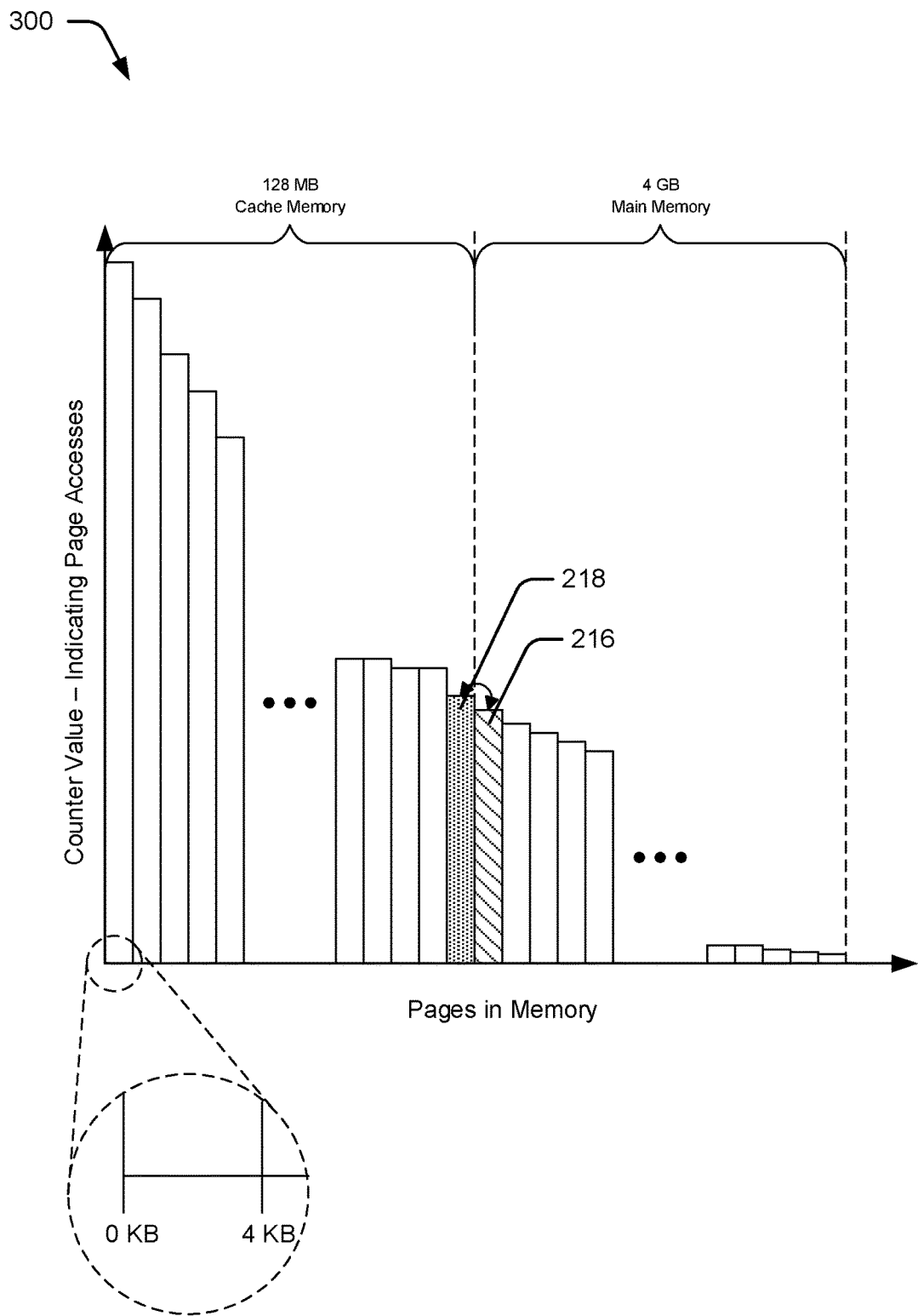
FIG. 3 illustrates a diagram showing example page counter values for the main and cache memories at a second time, subsequent to the first time.

For context, consider FIGS. 2 and 3, which illustrate diagrams of example page counter values for main and cache memories. Diagram 200 of FIG. 2 shows the example page counter values for the main and cache memories at a first time, and diagram 300 of FIG. 3 shows the example page counter values for the main and cache memories at a second time, subsequent to the first time. As discussed in more detail below, the mover 114 checks the information about requested page accesses. The mover 114 also initiates page swaps at a predetermined interval of time, e.g., once every microsecond (µs). With reference to the predetermined interval of time, the first time corresponding to the diagram 200 may be before the occurrence of a particular such predetermined time interval while the second time corresponding to the diagram 300 is after the occurrence of the particular predetermined time interval.

The diagram 200 includes a first axis 202 that corresponds to counter values which indicate the number of page accesses. A second axis 204 of the diagram 200 represents the pages maintained in memory. The diagram 200 also includes dividing line 206. The bars illustrated to the left of the dividing line 206 represent counter values of pages in the cache memory 106 at the first time, while the bars illustrated to the right of the dividing line represent counter values of pages in the main memory 108 at the first time. In the particular example illustrated by FIGS. 2 and 3, the cache memory 106 is 128 megabytes (128 MB), the main memory 108 is 4 gigabytes (4 GB), and each page of data is 4 kilobytes (4 KB). Thus, the bars to the left of the dividing line 206 represent 128 MB worth of 4-KB pages, while the bars to the right of the dividing line 206 represent 4 GB worth of 4-KB pages (1 million pages). It should be appreciated that these are merely exemplary sizes and that sizes of the cache memory 106, the main memory 108, and the pages maintained therein can vary from the sizes used in the example without departing from the spirit or scope of the techniques described herein.

For greater ease in understanding the explained concepts, FIGS. 2 and 3 have been illustrated to represent the above described scenario in which data corresponding to pages in the main memory 108 is simply exchanged with the data corresponding to pages in the cache memory 106, such that when a page is cached, its data is in cache memory 106, but not in the main memory 108. In these scenarios, memory users recognize addressable memory as the combination of 4 GB and 128 MB (e.g., a combination of the main memory 108 and the cache memory 106). In implementation, however, when the cache memory 106 is small relative to the main memory 108 (128 MB versus 4 GB), the main memory 108 and the cache memory 106 may be configured according to the other memory configuration and swapping scenarios described above.

In the other memory configuration and swapping scenarios described above, a page in the cache memory 106 and a page in the main memory 108 together provide the valid data of a cached page. In these other scenarios, when pages are cached, at least some data corresponding to the cached pages may be in the cache memory 106 and at least some data corresponding to the cached pages may also be in the main memory 108. In some instances, however, some of the pages in the cache memory 106 may not contain valid data, because those pages are not filled. Some of the pages in the main memory 108 also may not contain valid data, such as when an entirety of those pages' data has been modified in the cache memory 106. In accordance with these other configuration and swapping scenarios, and given the example in which the main memory 108 is 4 GB and the cache memory is 128 MB, memory users recognize the addressable memory as simply 4 GB (e.g., solely the main memory 108). When filling a 4-KB page of data from the main memory 108 into the cache memory 106, the mover 114 may not fill each portion of the page's 4 KB of data into the cache memory 106. For example, the mover 114 may instead fill 1 KB of the page's data into the cache memory 106. The mover may fill the 1 KB of data that is close to a request address, such as if there is some uncertainty as to whether the other 3 KB will even be used. When it is anticipated that most of the requests to a page will be write requests, the mover 114 may not fill the page's data that will be overwritten into the cache memory 106. Rather, the mover 114 can fill into the cache memory 106 information to indicate where to find each 64-byte portion of the page.

Returning to the illustrated example of FIGS. 2 and 3, the bars that represent the pages are ordered from left to right in descending counter value order, and also within the bounds of the cache memory 106 and the main memory 108. Thus, bar 208, which represents the number of page accesses of the most-accessed page in the cache memory 106 corresponds to a greater counter value than bar 210, which represents the number of page accesses for the second-most-accessed page in the cache memory 106. Similarly, bar 212, which represents the number of page accesses of the second-least-accessed page in the main memory 108, corresponds to a greater counter value than bar 214, which represents the number of page accesses of the least-accessed page in the main memory 108.

Of particular note are bars 216, 218, which represent a least-requested page in the cache memory 106 and a most-requested page in the main memory 108, respectively, at the first time. In the illustrated example, the bar 216 is smaller than the bar 218, and thus represents that access to the least-requested page in the cache memory 106 has, at the first time, been requested less than access to the most-requested page in the main memory 108.

The diagram 300 is similar to the diagram 200, it includes axes that represent counter values and pages maintained in memory, the dividing line between the pages maintained in the cache memory 106 and the main memory 108, and so on. The diagram 300 differs from the diagram 200 in a notable respect, however. In the diagram 300 the bars 216, 218 are swapped, representing a swap of the corresponding pages between the cache memory 106 and the main memory 108. In other words, the diagram 300 illustrates a scenario in which the page represented by the bar 216 is moved into the main memory 108 (e.g., by the mover 114) and the page represented by the bar 218 is moved into the cache memory 106 (e.g., by the mover 114).

As mentioned above, the diagram 200 corresponds to a first time and the diagram 300 corresponds to a second time that is subsequent to the first time. For the purpose of clarity, it may be assumed in FIGS. 2 and 3 that requests to access the pages represented by the illustrated bars have not been made between the first and second times. In other words, the counter values for the pages represented in the diagrams 200, 300 are the same at both times. Between the first time and the second time, however, a moving period, the time during which the mover 114 swaps pages between the cache memory 106 and the main memory 108, is assumed to have occurred. The first time and the second time may thus represent slices of time, respectively, directly before and directly after the moving period. Between the first and second times, therefore, the profiling cache replacement techniques are applied by the mover 114 to optimize the cached pages for the memory-profiling computing device 102.

Figure 4:
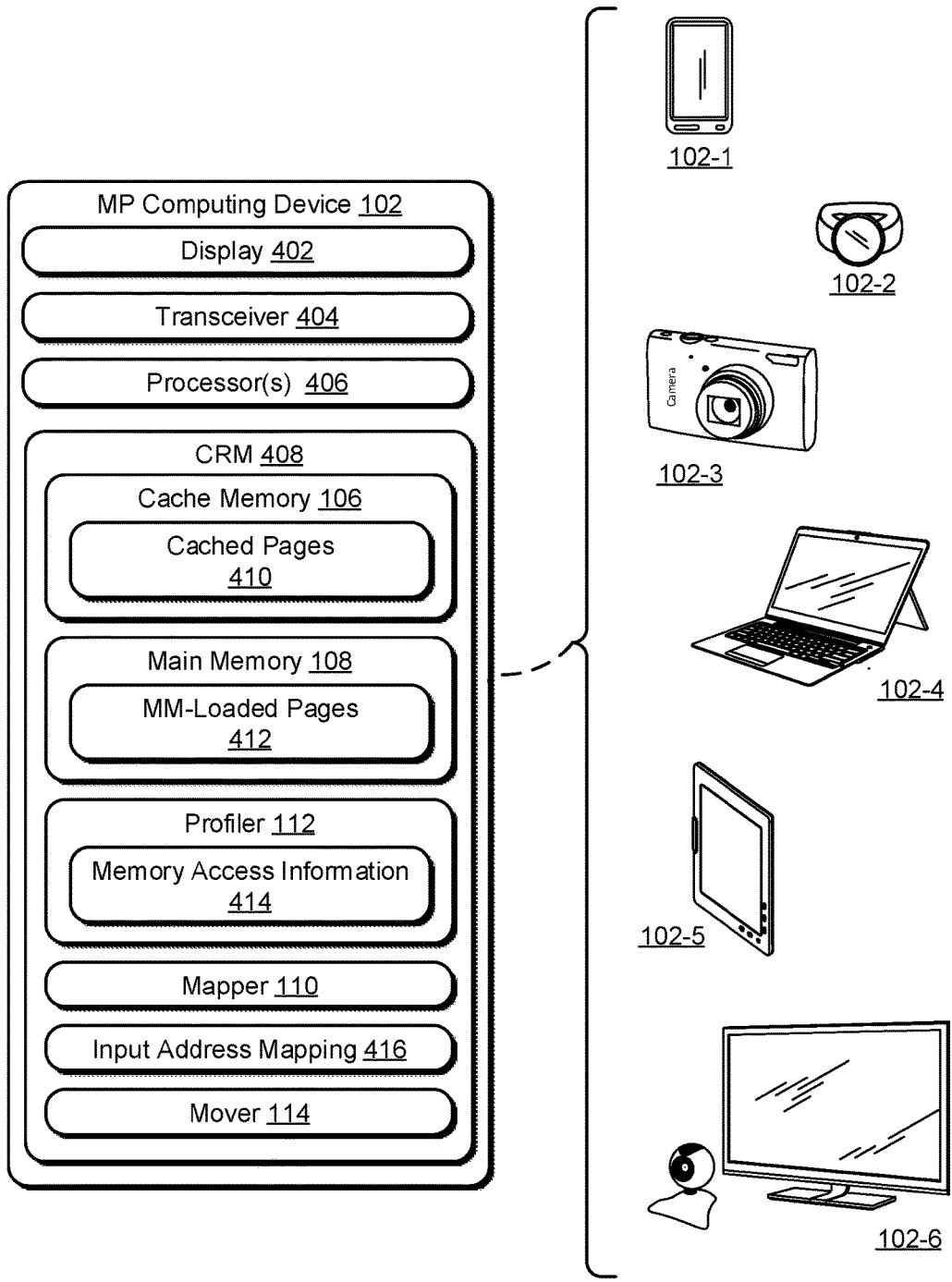
FIG. 4 illustrates an example memory-profiling computing device of FIG. 1.

With regard to the example memory-profiling computing device 102 of FIG. 1, consider a detailed illustration in FIG. 4. The memory-profiling computing device 102 can be one or a combination of various devices, here illustrated with six examples: a smartphone 102-1, a computing watch 102-2, a digital camera 102-3, a laptop 102-4, a tablet computer 102-5, and a desktop computer 102-6 though other computing devices and systems, such as a netbook, a gaming console, or a set-top box may also be used. As noted above, in some embodiments the techniques operate, at least in part, through a remote computing device. The remote computing device can be configured as a server, for example. In such cases, some computing can be forgone locally, e.g., by communicating data enabling the computing through a communication device having limited computing operations or even communicating the data enabling the computing directly from memory-profiling computing devices 102 to the server.

The memory-profiling computing device 102 includes or is able to communicate with a display 402 (five are shown in FIG. 4), a transceiver 404, one or more processors 406, and computer-readable storage media 408 (CRM 408). The transceiver 404 is capable of sending and receiving data directly or through a communication network, such as client application data from devices 102 through a local area, wide area, personal area, cellular, or near-field network.

In one or more implementations, the cache memory 106, the main memory 108, the profiler 112, the mapper 110, and the mover 114 are embodied on the CRM 408. The cache memory 106 includes cached pages 410 and the main memory includes main-memory loaded pages 412 (MM-loaded pages 412). The profiler 112 includes memory access information 414, which is collected by the profiler 112 about memory accesses. By way of example, the memory access information 414 includes counters that indicate numbers of requests to access the cached pages 410 and the MM-loaded pages 412. The CRM 408 also includes input address mapping 416, which maps input addresses (such as those provided by a memory user to access pages of information in the cache or main memories) to an address of one of the cached pages 410 in the cache memory 106 (a cache hit), or one of the MM-loaded pages 412 in the main memory 108 (a cache miss).

As discussed above, the mapper 110 is used for each memory access, and represents functionality to map an input address to an address in the cache memory 106 or the main memory 108. When the mapper 110 receives an input address (e.g., for requesting access to a page of data from memory), the mapper 110 may refer to the input address mapping 416 and return a corresponding address of the cache memory 106 or of the main memory 108.

The profiler 112 is also employed with each memory access. In particular, the profiler tracks the number of accesses to the cached pages 410 and the MM-loaded pages 412. In one or more implementations, the profiler 112 maintains, as part of the memory access information 414, respective counters for each of the cached pages 410 and each of the MM-loaded pages 412. In this scenario, when one of the cached pages 410 or one of the MM-loaded pages 412 is accessed, the profiler 112 increments the respective counter to indicate the access. In some implementations, however, maintaining an incrementable counter for each of the cached pages 410 and each of the MM-loaded pages 412 may consume too much storage space. If the profiler 112 uses 8-bit counters, the main memory is 4 GB, and each of the MM-loaded pages 412 is 4 KB, for example, then 1 MB of memory is used simply to store the counters for one million pages—which may not be suitable in some implementations, e.g., when the memory access information 414 is stored in static random-access memory (SRAM). Accordingly, the profiler 112 can track and maintain the memory access information 414 in manners that utilize less storage. The profiler 112 may, for instance, implement counters that reduce total counter storage through dynamic expansion of a range of the counters or such that there are fewer counters than one for each page of memory.

With regard to reducing total counter storage through dynamic expansion, the profiler 112 may in one or more default implementations use 8-bit counters, and in one or more other implementations use dynamically expanding counters. To implement counters for which the range expands dynamically, floating point representations can be used. Broadly speaking, access counts of the pages in the cache memory 106 and the main memory 108 have a high dynamic range, e.g., highly-accessed pages can be accessed significantly more than little-accessed pages, and the number of accesses of highly-accessed pages can continue to increase during system operation.

In one or more implementations, including implementations in which dynamically expanding counters are employed, the data in memory can be divided into sets. In other words, the cached pages 410 and the MM-loaded pages 412 can be divided into sets of pages, such that each set includes some of the cached pages 410 and some of the MM-loaded pages 412. In the continuing example in which the cache memory 106 is 128 MB, the main memory 108 is 4 GB, and each page is 4 KB, for instance, the pages can be divided into sets such that each set includes 512 of the MM-loaded pages 412 and 16 of the cached pages 410. When the data in memory is divided into sets, the mover 114 can swap the cached pages 410 in a set with the MM-loaded pages 412 that are also in the set. Consequently, when checking counters, the mover 114 may, in this example, check 512 counters to determine the most- and least-requested pages. The mover 114 does not, however, swap the cached pages 410 in the set with the MM-loaded pages 412 from other sets.

In dynamically expanding counter implementations, the profiler 112 can keep a common scale S for each set of pages, and an N-bit counter C for each page in a set. By way of example, the profiler can implement the common scale S for a set of pages using 6 bits. Broadly speaking, the profiler 112 can use a common scale when pages are divided into sets because counter values are compared within a set, e.g., since solely the pages in the cache memory 106 and the main memory 108 of a same set are swapped. Having the common scale S and the N-bit counter C, the profiler 112 can maintain counters such that their values equal $C \times 2^S$.

In contrast to default implementations of profiling cache replacement in which the profiler 112 increments the counter value by 1 for each access of a page, in implementations in which dynamically expanding counters are used, the profiler 112 increases the page's counter C with a probability of $$\frac{1}{2^S}.$$

This allows the profiler 112 to generate S random bits, and then increase the counter solely when each of the S bits is zero. When the counter C of a page overflows (e.g., when the previous N-bits are not enough to represent page accesses), the profiler 112 can increase the common scale S for the page's set by one, and divide each of the counter values for the particular page causing the overflow as well as for the other pages of the set by two.

Consider a scenario in which this scheme for dynamically expanding counters is employed. The profiler 112 can store each counter value in a variety of different ways. For example, the profiler 112 can store a counter value equal to C, in which C is simply a binary integer. The profiler 112 can also store a counter value equal to $C \times 2^S$, where C is again a binary integer. The profiler 112 can also increase a dynamic range of individual counters using a simple floating point representation for C. The counter value stored by the profiler 112 can still equal $C \times 2^S$, however, the profiler 112 can encode C as:

$$C = K \times 2^E$$

Here, the term K represents a significand, which is a part of a floating point number consisting of its significant digits, and the term E represents the exponent of the base (2 is the base). Given this, the final counter value is:

$$K \times 2^{E+S}$$

If, in this scenario, it is assumed that the profiler 112 uses a 4-bit significand K (so that it can range in value from 0-15), and 3 bits for the exponent (so that it can range in value from 0-7), a 7-bit counter C can represent page access values in a range of $[0, 15 \times 2^7]$.

Consider an alternate scenario for employing dynamically expanding counters. In this alternate scenario, the profiler 112 encodes an individual counter C in a different manner. In particular, the encoding depends on a number of bits allotted for the significand K, which is represented herein as nK, and a number of bits allotted for the exponent E, which is represented herein as nE. If the exponent E is equal to zero, then the profiler 112 simply encodes the value of the counter C so that it is equal to the significand K, such that C=K. If the exponent E is greater than zero, however, the profiler 112 encodes the value of the counter C as follows:

$$C = (K + 2^{nk}) 2^{E-1}$$

If, in this alternate scenario, it is assumed that the number of bits allotted for the significand nK is 4 bits and the number of bits allotted for the exponent nE is 3 bits, then a counter can store values in a range of [0, 1984]. As mentioned above, in addition to reducing a size (in terms of number of bits) of individual counters, a number of counters can also be reduced in some storage-sensitive implementations, e.g., from one counter per page of memory to less than one counter per page of memory.

With regard to using fewer than one counter per page of memory, doing so is based on an observation that working sets of data used by memory users (e.g., client applications) in conjunction with common workloads are unlikely to equal or exceed a size of the main memory 108. Furthermore, since profiling cache replacement involves caching the highly-requested pages of the main memory 108 into the cache memory 106 rather than simply caching pages into the cache memory 106 simply because an access to those pages is requested, numbers of accesses of rarely requested pages in the main memory 108 are largely irrelevant for the techniques described herein. Accordingly, the profiler 112 may maintain counters for the pages that are accessed more often.

To reduce the number of counters used to track the pages in the cache memory 106 and the main memory 108, tags may be used to identify a page with which each of the counters is associated. When access is requested to a page that is associated with a counter, the profiler 112 updates the counter in one of the manners described above to indicate the access. When access is requested to a page that is not associated with a counter (e.g., a page for which accesses are not currently being tracked by a counter), however, one of the counters that is already used to track accesses to a different page may be disassociated with the different page and associated with the requested but previously unassociated page.

Some conventional techniques for disassociating counters with tracked pages and associating them with requested but previously unassociated pages can cause thrashing. In one or more implementations, profiling cache replacement involves applying one or more modified counter tagging techniques to disassociate counters with tracked pages and associated them with requested but previously unassociated pages. These modified counter tagging techniques can reduce thrashing in comparison to conventional techniques.

The profiler 112 applies the modified counter tagging techniques by maintaining a number of counters N as part of the memory access information 414. Each counter comprises a data pair representing a page tag that identifies a page with which the counter is associated and a count associated with the page, e.g., in the form {page, count}. When access to a particular page X is requested, the profiler 112 checks to see if there is a counter {X, C} that is associated with the particular page X. If there is a counter associated with the particular page X, e.g., {X, C} exists, then the profiler 112 increments the count C by one. If there is no counter associated with the particular page X, the profiler 112 finds a counter {Y, C} for a page Y having a smallest count C. The profiler 112 then replaces the value of the counter so that it is associated with the particular page X and indicates one access of the particular page X, e.g., the profiler adjusts the pair of values of {Y, C} to {X, 1}. This is different from conventional techniques which inherit a previous count. In other words, instead of replacing C with 1 as the modified counter tagging techniques do, conventional techniques replace C with C+1. By counting page accesses with the modified counter tagging techniques, a number of counters N with the largest counts correspond to the top-n pages.

Regardless of how the counters are implemented, the mover 114 represents functionality to check the counters maintained in the memory access information 414 for determining whether to swap pages between the main memory 108 and the cache memory 106. As mentioned above, the mover 114 performs these checks to make the determinations to initiate page swaps at a predetermined interval of time, such as every microsecond (1 µs). Although the examples discussed herein refer to the interval of time being predetermined and corresponding to 1 µs, the interval of time may be different without departing from the spirit or scope of the techniques described herein. By way of example, the predetermined interval can also be determined randomly, based on a number of accesses as discussed in more detail below (e.g., a total number of accesses requested for pages from the profiled memory 104), and so on.

At the predetermined interval of time (each microsecond), the mover 114 can make the determinations in accordance with the techniques described herein. Rather than using an absolute time (e.g., the predetermined interval of time), the mover 114 can alternately make the determinations every N memory accesses per set of pages. In this way, the techniques described herein can control a percentage of the background bandwidth used instead of an absolute value of the background bandwidth used.

Regardless of frequency, during the moving period, the mover 114 is configured to determine whether highly-requested pages of the main memory 108 are requested more than little-requested pages in the cache memory 106. The highly-requested pages of the main memory 108 are highly-requested relative to the MM-loaded pages 412, and the little-requested pages in the cache memory 106 are little-requested relative to the cached pages 410. The number of requests for the highly-requested main memory pages may be substantially similar, however, to the number of requests for the little-requested cache memory pages.

If the highly-requested pages in the main memory 108 are requested more than the little-requested pages in the cache memory 106, the mover 114 swaps the highly-requested pages of the main memory 108 with the little-requested pages of the cache memory 106. To do so, the mover 114 evicts the little-requested pages from the cache memory 106 and fills the highly-requested pages of the main memory into the cache memory 106. Since operation of the mover 114 competes with demand requests from memory users (e.g., client applications), limiting performance of the mover 114's determining and swapping operations to the moving period reduces the mover 114's impact on the memory users—reducing the latency of memory access for the memory profiling computing device 102. The mover 114 thus operates in the background while memory users access pages of data from the cache memory 106 and the main memory 108.

In addition to limiting operation of the mover 114 to the background, page access requests made by memory users are given priority over page access requests made for the purpose of optimizing memory, e.g., page swaps requested by the mover 114. The requests made to access pages of data from the cache memory 106 and the main memory 108 can generally be divided into two types—demand requests and background requests. The term "demand request" refers to a request made by a memory user, such as a client application, for a page of data from the cache memory 106 or the main memory 108. The term "background request" refers to a fill or eviction request triggered indirectly by the demand request, such as the fill and eviction requests made by the mover 114 in conjunction with swapping pages between the main memory 108 and the cache memory 106.

The techniques described herein give priority to fulfilling the demand requests over fulfilling the background requests in a couple ways. First, the techniques may allow a limited number of pending background requests, such as by maintaining the pending requests in a queue configured to hold the limited number of pending background requests. If the queue is full when a background request is made, the request is simply dropped, e.g., the request is not added to the queue. Indeed, other background requests are not added to the queue until at least one of the pending background requests in the full queue is serviced.

The second way in which the techniques described herein give priority to fulfilling the demand requests over fulfilling the background requests, involves an implementation in which a dynamic random-access memory (DRAM) request queue is used, and in which the background requests are allowed to fill a limited amount (e.g., half) of the DRAM request queue. If, for example, a fill level of the DRAM request queue is more than half of the queue's maximum fill level, then the techniques described herein limit incoming requests to demand requests. Here, background requests can be stalled when the fill level of the DRAM request queue is more than half of the queue's maximum fill level. For instance, a background request initiated by the mover 114 is dropped if there are too many mover-requested background requests pending. Nonetheless, the background requests initiated by the mover 114 not dropped are disassembled into DRAM requests and sent to the DRAM request queue. If the DRAM request queue surpasses a particular threshold (e.g., half of the queue's maximum fill level), indicating that the DRAM request queue is too busy to currently handle incoming DRAM requests, further background requests are not sent to the DRAM request queue. Instead, the background DRAM requests are held until the DRAM request queue level is lower than the threshold. Once the DRAM request queue is able to again handle background DRAM requests, the held requests are sent to the DRAM request queue.

During operation, the workload that memory users impose on the profiled memory 104 can change over time. In conjunction with changing workloads, the highly-requested pages can also change. In other words, pages cached and highly-requested in the main memory 108 while one client application operates may not be the same as the pages cached and highly-requested in the main memory 108 while another client application operates. To ensure that the cache memory 106 is filled with pages that correspond to the current operations of the memory-profiling computing device 102, the profiler 112 can decay values of the page counters. By automatically decaying counter values at some decay interval, pages that were once heavily accessed can be evicted from the cache memory 106 when their use wanes.

In one or more implementations, the profiler 112 can simply divide each of the counter values of a set in half at the decay interval. Consider an example in which the decay interval corresponds to a predefined threshold for a total number of accesses requested for the pages in a set, e.g., $2^{14}$ accesses. In this example, when the total number of accesses for pages in a set exceeds $2^{14}$ accesses, the profiler 112 divides the counter values of the set by two. With reference back to implementations that use the common scale S, the profiler 112 decays the counters by decreasing the common scale S of a set by one when the set's common scale S is greater than zero. If the set's common scale S is already zero, however, the profiler 112 divides each of the set's counters by two. In yet other implementations, the decay interval corresponds to some predetermined absolute time rather than the predefined number of accesses. It should be appreciated that the counters can be decayed in manners other than being divided by two without departing from the spirit or scope of the techniques described herein. By way of example, rather than being divided by two the counters can be multiplied by a factor such as two-thirds (⅔).

With further regard to further scenarios that arise during operation of the memory-profiling computing device 102, in some cases counters for the little-requested pages of the cache memory 106 and the highly-requested pages of the main memory 108 can have the same or very similar values. With reference to a set of pages, the cached pages of the set that are little-requested (compared to other cached pages) and the set's highly-requested pages of the main memory 108 can have the same or very similar values. Difficulties can arise when the mover 114 is to determine which pages to cache when cached pages have similar counter values to pages that are candidates for being cached. Consider an example in which a first page of a set is accessed slightly more than other pages of the set. As a result of having more accesses, the mover 114 can cache the first page. Consider also, however, that later a second page of the set becomes accessed slightly more than the first page. As a result of the subsequent accesses, the mover 114 replaces the first page with the second page, thereby evicting the first page from the cache memory 106. In a set of pages that is cyclically referenced, slightly more accesses of the first page again can cause the mover 114 to replace the second page in the cache memory, and so on. This scenario can cause thrashing for these pages, and can be especially problematic when decaying counters are used and the decaying interval is short.

To prevent such thrashing, the mover 114 can add a barrier of entry before determining to swap the highly-requested pages of the main memory 108 with the little-requested pages of the cache memory 106. Thus instead of swapping the highly-requested pages of the main memory 108 with the little-requested pages of the cache memory 106 whenever a number of requested accesses of the highly-requested main memory pages is greater than the number of requested accesses of the little-requested cached pages, the mover 114 can instead determine to swap pages when the number of requested accesses of the highly-requested main memory pages is greater than number of accesses of the little-requested cached pages and the entry barrier. By way of example, the mover 114 can determine to swap pages when the following is true:

AccessCount(high *MM* page)>(AccessCount(little *CM* page)+Δ)

In this expression, Δ represents the entry barrier and can correspond to a predetermined integer, such as an integer that offsets a resource cost (e.g., time, power, etc.) to swap the pages.

Profiling cache replacement can be implemented in still other ways without departing from the spirit or scope of the techniques described herein. One example of an alternate implementation is to use time-multiplexed counters. Instead of maintaining counters solely for the pages that are accessed most, the profiler 112 can maintain counters for each of the pages. At any given time, however, the profiler 112 may have access to a limited number of the counters. Consider a scenario in which one sixteenth of the counters are maintained in SRAM and the other fifteen sixteenths are maintained in DRAM. When access is requested to a page for which the counter is in the SRAM, the profiler 112 simply increments the counter. When access is requested to a page for which the counter is in the DRAM, however, the profiler 112 ignores the request. Periodically, these time-multiplexed counter techniques flush the counters in the SRAM back to DRAM, and load another one sixteenth of counters from DRAM into SRAM. It is assumed that by doing so over some period of time each counter will have approximately one sixteenth of the actual access count value. The mover 114 can be configured to check the counters in both the DRAM and SRAM.

Another example of an alternate embodiment is to bundle the counters in a page table data structure. Thus, instead of maintaining separate counters, the profiler 112 can bundle the counters in a page table data structure. In so doing, management of the counters may follow a same flow as the page table and a translation lookaside buffer (TLB). In yet another example of an alternate embodiment, counter decaying can be implemented by decreasing the common scale S gradually, resulting in a fractional S. Instead of decaying each counter value at the predetermined decaying interval, the represented counter values can be decayed gradually by decreasing the common scale S gradually.

These and other capabilities, as well as ways in which entities of FIGS. 1 and 4 act and interact, are set forth in greater detail below. These entities may be further divided, combined, and so on. The environment 100 of FIG. 1 and the detailed illustrations of FIG. 4 illustrate some of many possible environments capable of employing the described techniques.

Example Methods

Figure 5:
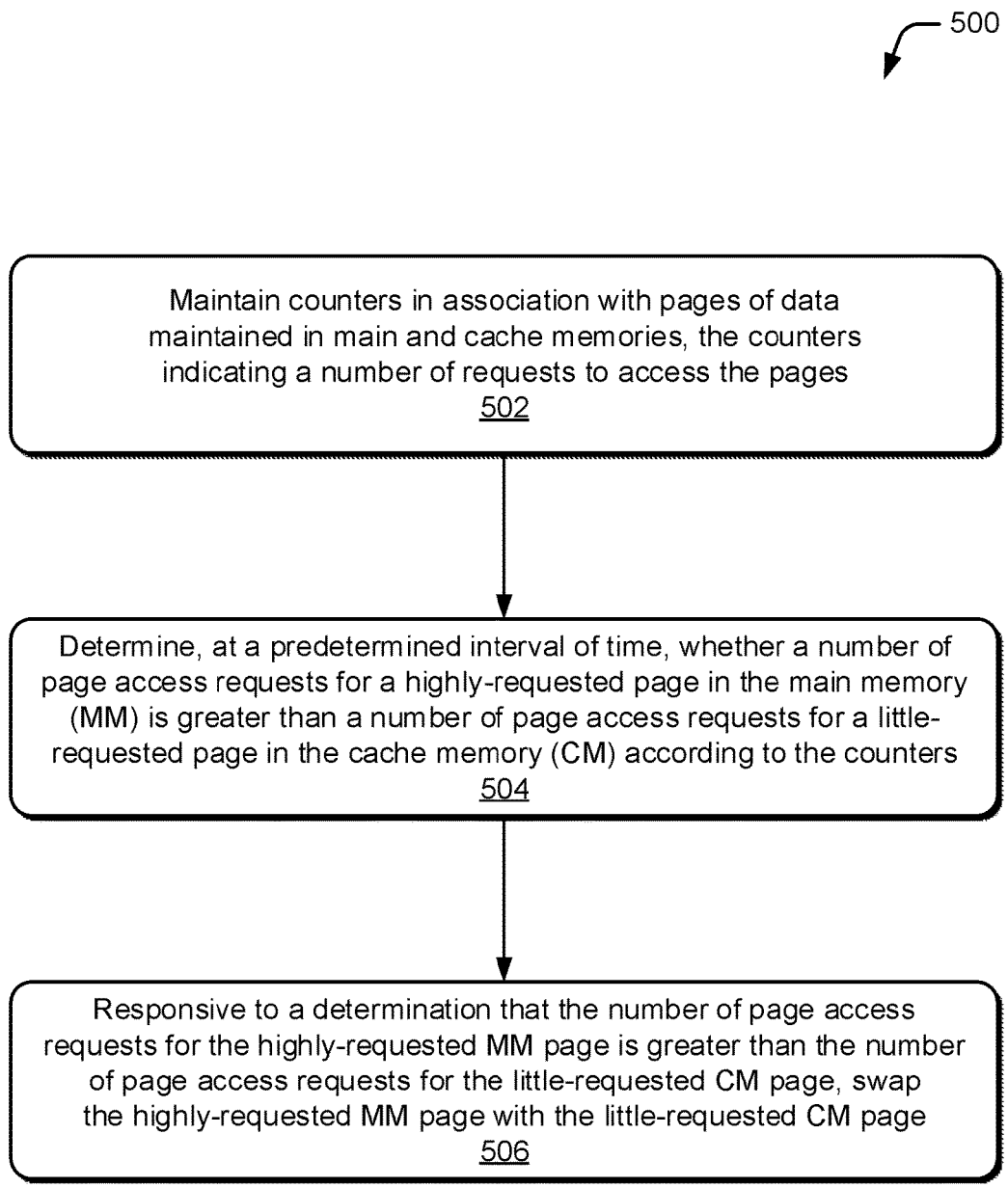
FIG. 5 illustrates a method to replace pages in cache memory according to a profiling algorithm.
Figure 6:
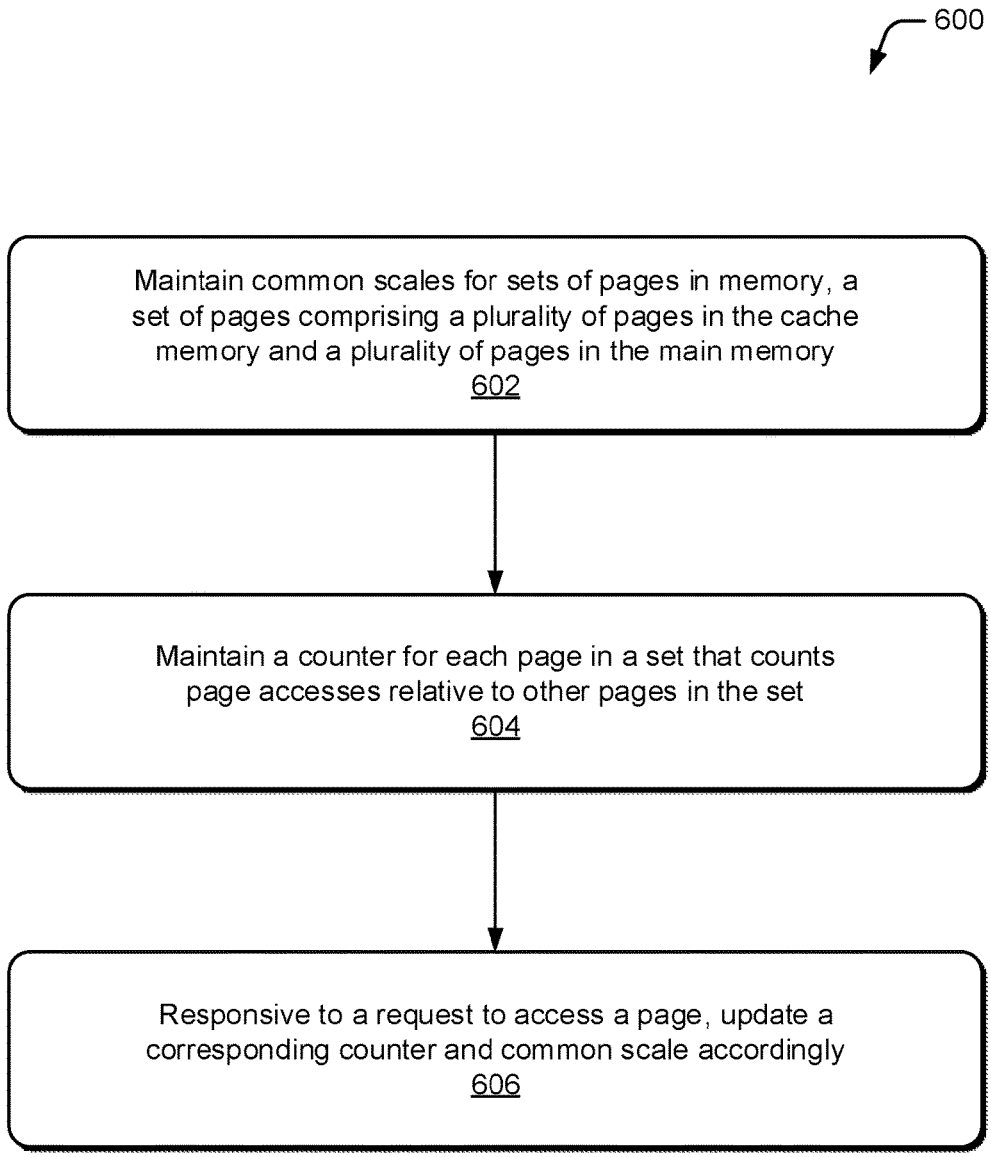
FIG. 6 illustrates a method to count page accesses for profiling cache replacement using reduced-space counters.
Figure 7:
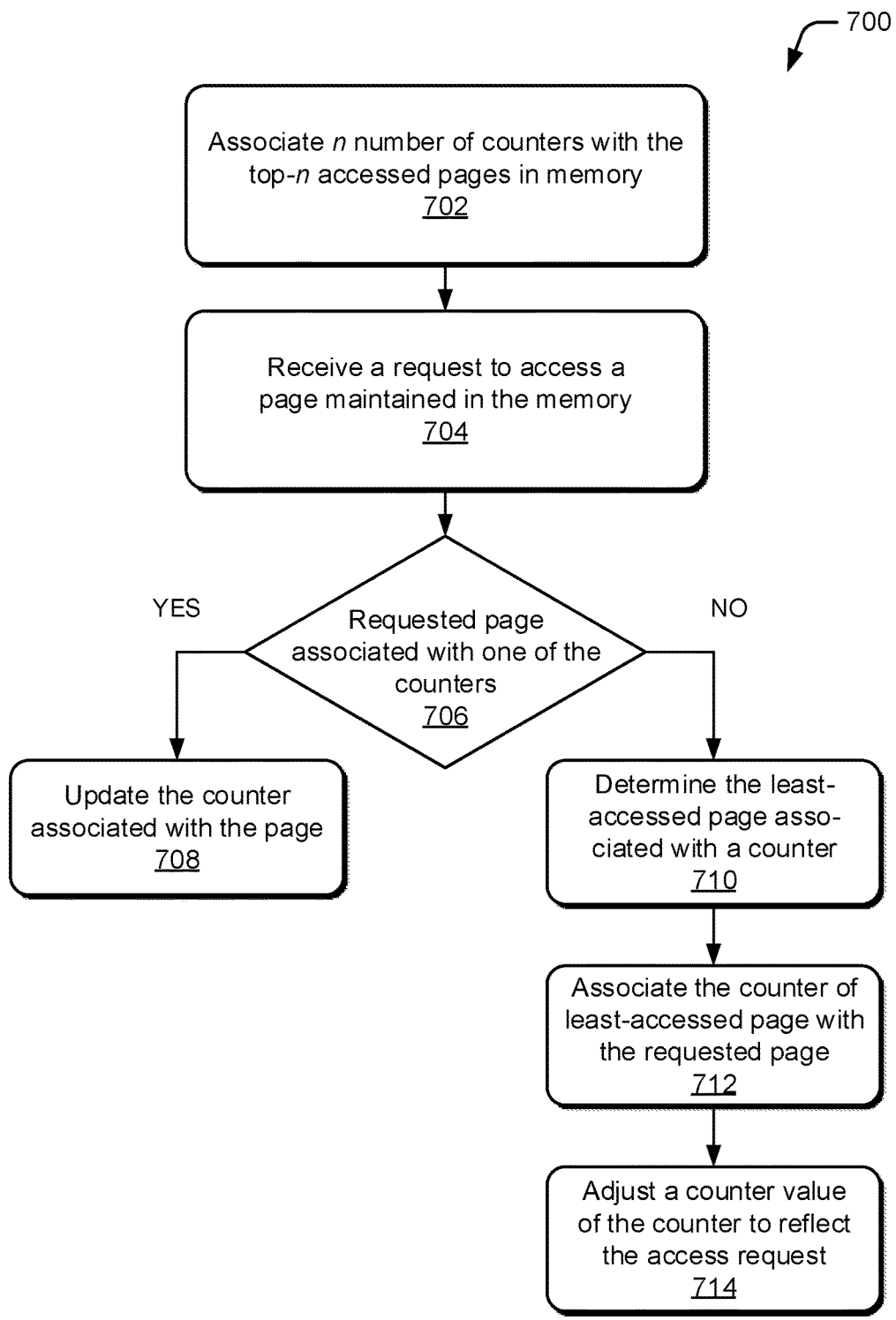
FIG. 7 illustrates a method to count page accesses for profiling cache replacement using fewer than one counter per page of memory.

FIGS. 5-7 depict methods enabling or using profiling cache replacement. These methods are shown as sets of blocks that specify operations performed but are not necessarily limited to the order or combinations shown for performing the operations by the respective blocks. In portions of the following discussion reference may be made to environment 100 of FIG. 1 and entities detailed in FIG. 4, reference to which is made for example only. The techniques are not limited to performance by one entity or multiple entities operating on one device.

FIG. 5 depicts method 500, which describes manners in which to replace pages in cache memory according to a profiling algorithm used to manage data migration between the cache memory and a main memory.

At 502, counters maintained in association with pages of the data maintained in the main and cache memories are updated. The counters are configured to indicate a number of requests to access the pages maintained in the main and cache memories. By way of example, the profiler 112 maintains counters in the memory access information 414. These counters indicate a number of requests to access the cached pages 410 and the MM-loaded pages 412. Responsive to requests to access one of the cached pages 410 or one of the MM-loaded pages 412, for instance, the profiler 112 increments corresponding counters in the memory access information 414.

So as not to interfere with memory accesses of memory users, such as client applications, profiling memory replacement is performed in a background of servicing requests made by the memory for the pages maintained in the cache memory 106 and the main memory 108. In so doing, performance of the method steps 504 and 506 can be limited to being performed at a predetermined time interval, such as every microsecond (μs). At 504, a determination is made at the predetermined time interval as to whether a number of page access requests for a highly-requested page of the main memory is greater than a number of page access requests for a little-requested page of the cache memory according to the counters. The highly-requested page of the main memory is highly-requested relative to the pages loaded in the main memory, and the little-requested page of the cache memory is little-requested relative to the pages loaded in the cache memory. The number of requests for the highly-requested main memory page may be substantially similar, however, to the number of requests for the little-requested cache memory page.

By way of example, the mover 114 checks the counters maintained by the profiler 112 in the memory access information 414. Every microsecond, for instance, the mover 114 determines a little-requested cached page 410 (e.g., that is requested less than other pages in the cache memory 106) and a highly-requested MM-loaded page 412 (e.g., that is requested more than other pages in the main memory 108) according to the counters. The mover 114 compares the respective counter values to determine whether the highly-requested page of the main memory 108 is requested more than the little-requested page of the cache memory 106.

Responsive to a determination that a number of page access requests for the highly-requested main memory page is greater than the number of page access requests for the little-requested cache memory page, at 506, the highly-requested main memory page and the little-requested cache memory page are swapped. By way of example, the mover 114 determines at step 504 that the highly-requested page from the main memory 108 is requested more than the little-requested page of the cache memory 106. Responsive to this determination, the mover 114 swaps the highly-requested page from the main memory 108 with the little-requested page of the cache memory 106. In other words, the mover 114 evicts the little-requested cache memory page from the cache memory 106 and loads that page into the main memory 108. The mover 114 also caches the highly-requested main memory page.

FIG. 6 depicts method 600, which describes manners in which page accesses are counted for profiling cache replacement using reduced-space counters.

At 602, common scales are maintained for sets of pages in memory. By way of example, the data maintained in the profiled memory 104 is divided into sets of pages, such that each set includes a plurality of pages from the cache memory 106 and a plurality of pages from the main memory 108. In particular, the pages can be divided into sets as described in more detail above. For each set of data, the profiler 112 maintains a common scale S, which indicates a base count or base number of accesses for the pages of the set. In one or more implementations, the profiler 112 maintains 4-bit common scales for each set of pages. It should be appreciated that different sized common scales (in terms of number of bits) may be used without departing from the spirit or scope of the techniques describe herein.

At 604, a counter is maintained for each of the pages in a set and that indicates a number of page accesses relative to other pages in the set. By way of example, the profiler 112 maintains an N-bit counter for each page in a set, as described in more detail above. The N-bit counter for a page, together with the common scale S of that page's set, indicates the number of accesses for the page. Responsive to a request to access a page, at 606, a corresponding counter and common scale are updated according to the access. By way of example, responsive to a request to access a page, the profiler 112 updates an N-bit counter associated with the requested page and also updates the common scale S associated with the requested page's set. The profiler 112 updates N-bit counters and common scales S as described in more detail above. It should be appreciated that the techniques described herein can utilize method 600 in one or more storage-sensitive implementations, e.g., when the memory access information 414 is stored in SRAM.

FIG. 7 depicts method 700, which describes manners in which page accesses are counted for profiling cache replacement using fewer than one counter per page of memory. Like the method 600, the method 700 can also be utilized for one or more storage-sensitive implementations.

At 702, n number of counters are associated with the top-n accessed pages in memory. By way of example, the profiler 112 associates n counters with the top-n accessed pages in the profiled memory 104. In particular, counters are associated with pages of the profiled memory 104 that are cached, leaving remaining counters to associate with the next most-accessed pages in the main memory 108.

At 704, a request is received to access a page maintained in memory. By way of example, a request is received to access a page of data maintained in the profiled memory 104, such as to access one of the cached pages 410 or one of the MM-loaded pages 412. At 706, a determination is made as to whether the requested page is associated with one of the counters, e.g., whether one of the counters has an attribute identifying the requested page. By way of example, the profiler 112 determines whether the requested page is associated with one of the counters maintained as part of the memory access information 414.

If a determination is made that the requested page is associated with one of the counters (e.g., "yes" at 706), then at 708, the counter associated with the requested page is updated. By way of example, the profiler 112 increments a counter value C for a counter associated with the requested page from C to C+1. If, however, a determination is made that the requested page is not associated with one of the counters (e.g., "no" at 706), then at 710, the least-accessed page associated with a counter is determined. By way of example, the profiler 112 determines a least-accessed page associated with a counter in a same set of pages as the requested page. Alternately, the profiler 112 simply determines the least-accessed page of the pages associated with counters. The profiler 112 can determine the least-accessed page by checking the counter values of the counters.

At 712, the counter of the least-accessed page is associated with the requested page. By way of example, the profiler 112 disassociates the least-accessed page with the counter and then associates the counter with the requested page, e.g., by changing a tag of the counter to identify the requested page. At 714, a counter value of the counter is adjusted to reflect the access request. By way of example, the profiler 112 adjusts a counter value C (which indicates a number of accesses of the page previously associated with the counter) by setting the counter value to one. Setting the counter value to one contrasts with some conventional techniques which involve setting the counter value C to C+1. In so doing, the method 700 can reduce trashing.

The preceding discussion describes methods relating to profiling cache replacement. Aspects of these methods may be implemented in hardware (e.g., fixed logic circuitry), firmware, software, manual processing, or any combination thereof. These techniques may be embodied on one or more of the entities shown in FIGS. 1, 4, and 8 (computing system 800 is described in FIG. 8 below), which may be further divided, combined, and so on. Thus, these figures illustrate some of the many possible systems or apparatuses capable of employing the described techniques. The entities of these figures generally represent software, firmware, hardware, whole devices or networks, or a combination thereof.

Example Computing System

Figure 8:
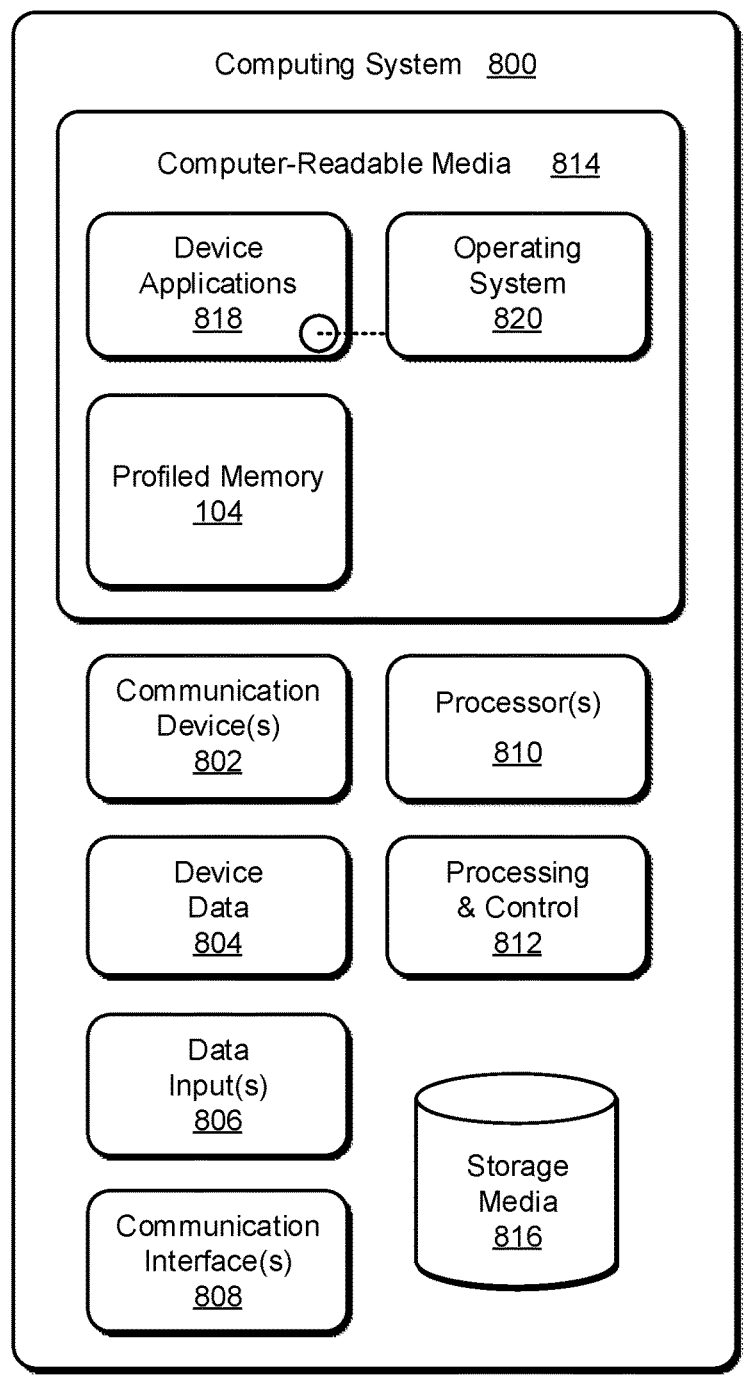
FIG. 8 illustrates an example computing system embodying, or in which techniques may be implemented that enable use of, profiling cache replacement.

FIG. 8 illustrates various components of example computing system 800 that can be implemented as any type of client, server, and/or computing device as described with reference to the previous FIGS. 1-7 to implement profiling cache replacement. In embodiments, computing system 800 can be implemented as one or a combination of a wired and/or wireless wearable device, System-on-Chip (SoC), and/or as another type of device or portion thereof. Computing system 800 may also be associated with a user (e.g., a person) and/or an entity that operates the device such that a device describes logical devices that include users, software, firmware, and/or a combination of devices.

Computing system 800 includes communication devices 802 that enable wired and/or wireless communication of device data 804 (e.g., received data, data that is being received, data scheduled for broadcast, data packets of the data, etc.). Device data 804 or other device content can include configuration settings of the device, media content stored on the device, and/or information associated with a user of the device. Media content stored on computing system 800 can include any type of audio, video, and/or image data, including complex or detailed results of profiling cache replacement acts. Computing system 800 includes one or more data inputs 806 via which any type of data, media content, and/or inputs can be received, such as human utterances, user-selectable inputs (explicit or implicit), messages, music, television media content, recorded video content, and any other type of audio, video, and/or image data received from any content and/or data source.

Computing system 800 also includes communication interfaces 808, which can be implemented as any one or more of a serial and/or parallel interface, a wireless interface, any type of network interface, a modem, and as any other type of communication interface. Communication interfaces 808 provide a connection and/or communication links between computing system 800 and a communication network by which other electronic, computing, and communication devices communicate data with computing system 800.

Computing system 800 includes one or more processors 810 (e.g., any of microprocessors, controllers, and the like), which process various computer-executable instructions to control the operation of computing system 800 and to enable techniques for, or in which can be embodied, profiling cache replacement. Alternatively or in addition, computing system 800 can be implemented with any one or combination of hardware, firmware, or fixed logic circuitry that is implemented in connection with processing and control circuits which are generally identified at 812. Although not shown, computing system 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 800 also includes computer-readable media 814, such as one or more memory devices in addition to the profiled memory 104 that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Computing system 800 can also include a mass storage media device 816. In this example, the computer-readable media 814 also includes a profiled memory 104.

Computer-readable media 814 provides data storage mechanisms to store device data 804, as well as various device applications 818 and any other types of information and/or data related to operational aspects of computing system 800. For example, an operating system 820 can be maintained as a computer application with computer-readable media 814 and executed on processors 810. Device applications 818 may include a device manager, such as any form of a control application, software application, signal-processing and control module, code that is native to a particular device, a hardware abstraction layer for a particular device, and so on.

Device applications 818 also include any system components, engines, or managers to implement the techniques.

CONCLUSION

Although embodiments of techniques using, and apparatuses enabling, profiling cache replacement have been described in language specific to features and/or methods, it is to be understood that the subject of the appended claims is not necessarily limited to the specific features or methods described. Rather, the specific features and methods are disclosed as example implementations of these techniques.

What is claimed is:

1. A method for managing data migration between a main memory and a cache memory, the method comprising:
    maintaining counters in association with pages of the data maintained in the main memory and the cache memory, the counters indicating numbers of requests to access the pages, the pages of the data maintained in the main memory and the cache memory divided into sets of pages, each set of pages including a plurality of pages from the cache memory and a plurality of pages from the main memory;
    dynamically expanding ranges of values that can be represented by the counters based on the maintaining; and
    at a predetermined time interval:
        determining whether a number of page access requests for a highly-requested page of the main memory in a given set is greater than a number of page access requests for a little-requested page of the cache memory in the given set according to the counters, the determining performed at the predetermined time interval on fewer than all of the sets of pages; and
        responsive to a determination that the number of page access requests for the highly-requested page of the main memory in the given set is greater than the number of page access requests for the little-requested page of the cache memory in the given set, swapping the highly-requested page of the main memory with the little-requested page of the cache memory within the given set.

2. The method as described in claim 1, wherein the little-requested page of the cache memory corresponds to a least-requested page of the cache memory, and the highly-requested page of the main memory corresponds to a most-requested page of the main memory.

3. The method as described in claim 1, wherein the determining and the swapping are performed in a background of servicing requests made by memory users to access the pages maintained in the main memory and the cache memory.

4. The method as described in claim 1, further comprising:
receiving a request to access at least one of the pages maintained in the main memory; and
servicing the request for the at least one requested page from the main memory without first filling the at least one requested page into the cache memory.

5. The method as described in claim 1, wherein pages of the main memory are not swapped with pages of the cache memory in different sets.

6. The method as described in claim 1, wherein the predetermined time interval is 1 microsecond (1 µs).

7. The method as described in claim 1, wherein the dynamically expanding comprises implementing the counters using at least one of a floating-point representation or a common scale.

8. A system comprising:
a main memory and a cache memory configured to maintain pages of data; the cache memory configured to maintain fewer of the pages than the main memory; the cache memory having at least one of lower latency, higher bandwidth, or lower power usage than the main memory; the pages of the data maintained in the main memory and the cache memory divided into sets of pages, each set of pages including a plurality of pages from the cache memory and a plurality of pages from the main memory;
a profiler configured to:
maintain counters in association with the pages maintained in the main memory and the cache memory, the counters configured to indicate numbers of requests to access the pages; and
dynamically expand ranges of values that can be represented by the counters based on the maintaining; and
a mover configured to:
make a determination at a predetermined time interval as to whether a number of page access requests for a highly-requested page in the main memory in a given set is greater than a number of page access requests for a little-requested page in the cache memory in the given set according to the counters, including being configured to check at the predetermined time interval fewer than all the sets of pages; and
responsive to a determination that the number of page access requests for the highly-requested page in the main memory in the given set is greater than the number of page access requests for the little-requested page in the cache memory in the given set, swap the highly-requested page in the main memory with the little-requested page in the cache memory within the given set.

9. The system as described in claim 8, wherein the profiler is further configured to maintain a respective counter for each of the pages in the main memory.

10. The system as described in claim 8, wherein the profiler is further configured to maintain fewer of the counters than one counter per page of data maintained in the main memory.

11. The system as described in claim 8, wherein the predetermined time interval comprises 1 microsecond (1 µs).

12. The system as described in claim 8, further comprising a mapper configured to map an input address associated with a memory access request to a corresponding page in the main memory or the cache memory effective to service the memory access request.

13. The system as described in claim 8, wherein the profiler is configured to dynamically expand the ranges of values by implementing the counters using at least one of a floating-point representation or a common scale.

14. One or more computer-readable storage media comprising:
a main memory and a cache memory configured to maintain pages of data; the cache memory configured to maintain fewer of the pages than the main memory; and
the cache memory having at least one of lower latency, higher bandwidth, or lower power usage than the main memory; and
instructions that, responsive to execution by one or more processors, fill pages into the cache memory according to a profiling cache replacement technique by performing operations comprising:
maintaining counters in association with the pages of the main memory and the cache memory to indicate numbers of requests to access the pages;
dynamically expanding ranges of values that can be represented by the counters based on the maintaining;
making a determination at a predetermined time interval as to whether a number of page access requests for a highly-requested page of the main memory is greater than a number of page access requests for a little-requested page of the cache memory according to the counters; and
swapping the highly-requested page of the main memory with the little-requested page of the cache memory responsive to a determination that the number of page access requests for the highly-requested page of the main memory is greater than the number of page access requests for the little-requested page of the cache memory.

15. The one or more computer-readable storage media as described in claim 14, wherein the cache memory has a size of at least 128 megabytes (MB).

16. The one or more computer-readable storage media as described in claim 14, wherein the main memory has a size of at least 4 gigabytes (GB).

17. The one or more computer-readable storage media as described in claim 14, wherein the dynamically expanding comprises implementing the counters using at least one of a floating-point representation or a common scale.

18. The one or more computer-readable storage media as described in claim 14, wherein the maintaining counters comprises maintaining a quantity of counters that is less than one counter per page of the pages of data.

19. The one or more computer-readable storage media as described in claim 18, wherein the maintaining counters comprises using a tag to identify a page associated with each counter of the counters.

20. The one or more computer-readable storage media as described in claim 14, wherein
the operations further comprise updating the counters responsive to the swapping.

* * * * *